Sept. 15, 1959          J. J. O'CONNOR          2,904,106

DEVICE FOR REMOVING TRUCK TIRES FROM RIMS

Filed Aug. 1, 1956          2 Sheets—Sheet 1

INVENTOR.
Joseph J. O'Connor
BY
ATTORNEY

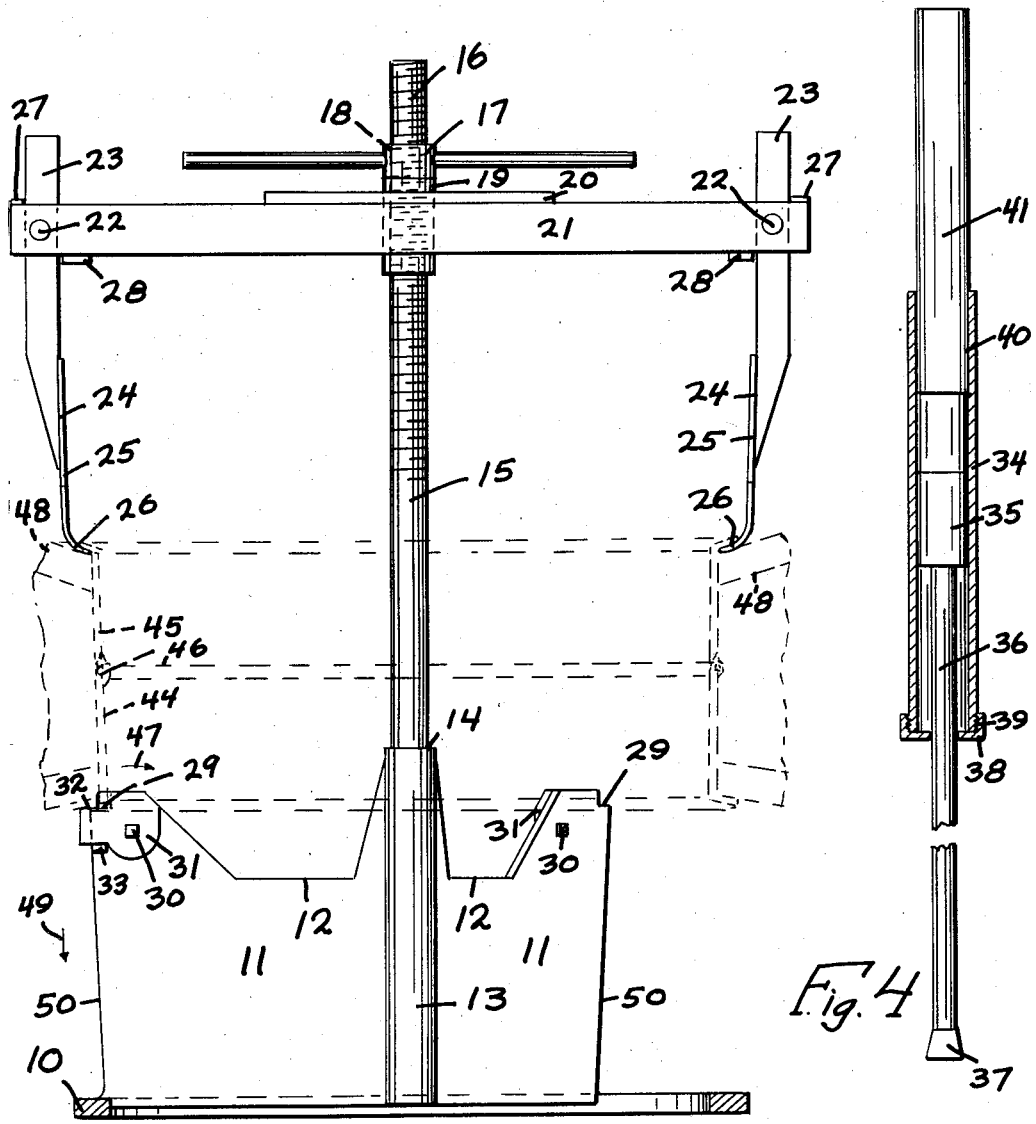

United States Patent Office 2,904,106
Patented Sept. 15, 1959

2,904,106

DEVICE FOR REMOVING TRUCK TIRES FROM RIMS

Joseph J. O'Connor, Vermillion, S. Dak.

Application August 1, 1956, Serial No. 601,571

1 Claim. (Cl. 157—1.2)

My invention relates to a device for removing truck tires from rims.

An object of my invention is to provide a device having certain lug attachments whereby the device will accommodate different diameter rims, and will allow the removal of a tire from such rims.

A further object of my invention is to provide a device which will apply sufficient pressure downwardly against the casing to remove the same or to loosen the same.

A further object of my invention is to provide a bead hammering device which will provide means for loosening the bead from the tire rim.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 3 is a sectional view taken substantially along the lines 3—3 of Figure 1, and Figure 4 is a sectional detail taken longitudinally of the tire bead hammering device.

Figure 1:
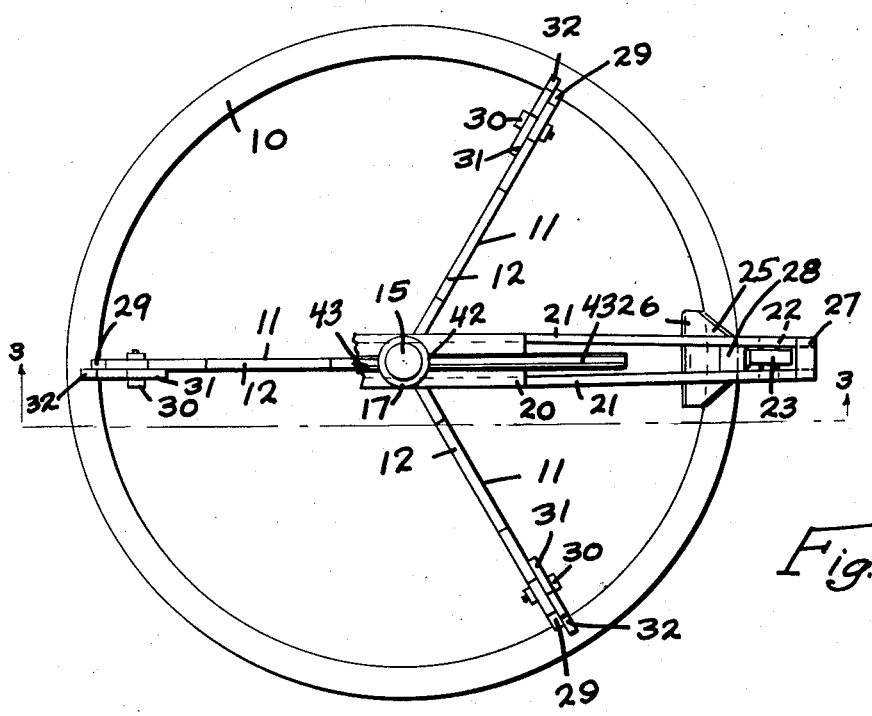
Figure 1 is a plan view of the device showing portions broken away.

I have used the character 10 to designate a base ring for maintaining my device in a rigid form, the character 11 indicating radially positioned ribs having the depressed portions at 12 for the reception of extending wheel portions, these ribs being attached to the ring 10 and also being secured to the centrally positioned vertical post 13 to which is attached at 14 the vertical rod 15 having the threaded upper end 16.

In normal use a collar 17 having turning bar 43 secured thereto at 42 and internal threads 18 will engage the threads 16 and will bear against a further annular collar 19 which bears against the plate 20, to which plate 20 are secured the side bars 21 which are pinned at 22 to the vertically positioned bars 23 to which are secured at 24 the spade members 25 having the arcuate ends 26. Attached to the bars 21 are the transverse small bar portions 27 and 28 to limit movement of the spades.

The ribs 11 include the indented shoulders at 29, and pivoted by means of the bolts 30 to the ribs 11 are the ears 31 having the indented shouldered portions 32, it being noted that these indented shouldered portions will be at a greater distance from the center of the arrangement than the portions 29. The small stop members 33 are provided to retain the ears 31.

Figure 4 illustrates an additional part of the tool in which the character 34 indicates a cylindrical member in which reciprocates a piston 35 which is attached to the rod 36, which rod 36 terminates in the tapered portion 37, the character 38 indicating a keeper which is threadably engaged at 39 with the tube 34. Rigidly attached at 40 within the tube 34 is the solid weighted rod 41.

Figure 2:
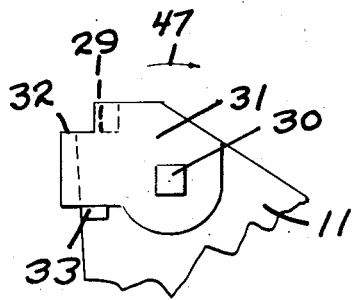
Figure 2 is a detail of the lug construction.

The device is operated in the following manner. This device is especially applicable to those types of tire rims in which the rims are split into two sections such as the sections 44 and 45 indicated by the dotted lines in Figure 3, and wherein the rims are usually joined by means of the locking bead portion 46, and in many cases due to the fact that such rims are inter-engaged, certain diameters of the rim sections will be of larger diameter than other diameters. As a result, the ears 31 will provide for such diameters since the ears 31 can be swung in the direction of the arrow 47 (see Figures 2 and 3) in which case the rim bearing the tire can be received in the shoulders 29, such shoulders being of the lesser diameters, and the center hole of the wheel is brought down over the rod 15, and next, the assembly comprising the bars 21, collar 17, and spades 25 is engaged with the threads 16 and the bars 43 are rotated to thereby bring this upper framework downwardly with the arcuate portions 26 of the spades 25 being engaged between the side flange of the rim and the tire beads 48. Just prior to this operation, however, the bead portions 46 have been broken apart. Pressure can then be exerted on the spade members by rotating the bars 43 still further, however, the important portion of the tool to be used at this time is that shown in Figure 4 wherein the portions 37 are inserted in the same approximate positions as the arcuate portions 26, and by grasping the cylindrical member 34 and moving the hand up and down, the impact of the weighted member 41 against the piston 35 will cause a considerable force to be applied, and as a result, the bead will be broken away from the rim flanges until the upper section 45 can be separated from the other section and the tire.

Next, the upper assembly comprising the collar 17 etc. can be removed and the other section 44 of the rim is turned over, still carrying the tire, and just before this action, the ears 21 will be swung back to the position shown in Figure 3, and since the indented shoulders 32 will be of a greater diameter, this diameter will then accommodate the larger diameter of the rim, whereupon the spade members 25 etc. are again brought downwardly and the tool shown in Figure 4 is then again used in the same manner whereupon the bead is loosened on the other side and then the spades are brought downwardly still further until the tire casing itself is loosened and passes downwardly in the direction of the arrow 49 as shown in Figure 3, the ribs 11 having the tapered edges 50 to facilitate passing of the tire over these portions, and as a result, the entire tire is thus removed. The spades 25 can be rotated to various positions.

The same arrangement can be used for old style rims as well, whereby such rims have a flange at one side and a locking ring on the other, the locking ring being removed, and with the ears in the position shown in Figure 3 the same operation can be performed.

It will be equally obvious that wherein varied diameters must be accommodated, the ear construction above described in combination with the other elements will perform the necessary operation.

It will now be seen that I have provided the advantages mentioned in the objects of my invention with other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A device for removing truck tires from rims comprising a plurality of radially positioned ribs, ears pivotally attached at the outer ends of said ribs for rotation in planes parallel to those of the ribs, stops means on said ribs to limit pivotal movement of said ears and support them in a position extending radially outwardly past said ribs, said ribs having indented shoulder portions at said outer ends, said ears also including indented shoulder portions radially outwardly of said indented shoulder portions on the ribs, said indented portions on said ears providing means for retaining a greater diameter rim, and whereby inward pivoting of said ears will provide means for accommodating a lesser diameter rim by engaging said rim with said rib shoulder portions, means for forcing a tire mounted on said rim downwardly comprising a vertically positioned post attached centrally to said ribs, an upper framework including spade members secured thereto, means for forcing said upper framework and spade members downwardly comprising a rotatable forcing member threadably engaged with said vertically positioned post, said spade members having arcuate extremities for engaging between a rim flange and a tire bead.

References Cited in the file of this patent

UNITED STATES PATENTS

| | | |
|---|---|---|
| 1,564,496 | Staugaard | Dec. 8, 1925 |
| 1,650,674 | Weaver | Nov. 29, 1927 |
| 2,345,346 | Larson | Mar. 28, 1944 |
| 2,446,963 | Stolz | Aug. 10, 1948 |
| 2,582,390 | Moore | Jan. 15, 1952 |

FOREIGN PATENTS

| | | |
|---|---|---|
| 475,141 | Italy | Oct. 15, 1952 |